United States Patent Office 3,073,792
Patented Jan. 15, 1963

3,073,792
COMPOSITION COMPRISING EPOXYPOLYBUTA-
DIENE AND LIMONENE DIEPOXIDE
Frank P. Greenspan, Larchmont, N.Y., assignor to
FMC Corporation, a corporation of Delaware
No Drawing. Filed Jan. 22, 1960, Ser. No. 4,005
6 Claims. (Cl. 260—29.8)

This invention relates to new and improved thermosetting resin compositions, and to the cured thermoset products produced therefrom. Particularly, this invention relates to novel modified epoxypolybutadiene compositions, and to improved products formed on curing these compositions.

It is known that polymers and copolymers of butadiene may be epoxidized, to form structures wherein the double bonds of the polymers are replaced with groupings wherein an oxygen atom bridges adjacent carbon atoms to form a three-membered ring; and that these epoxidized polybutadienes may be cured by reacting the polymers, through their epoxy groups, with polyfunctional curing agents, to form cross-linked thermoset products of very high molecular weight.

A general characteristic of epoxypolybutadienes, even those of relatively low molecular weight and low epoxy content, is their very high viscosity. Liquid polymers of butadiene, for example, become viscous oils or waxy solids on epoxidation, so that when it is desired to cure such resins by reacting with polyfunctional curing agents, it is difficult to obtain adequate mixing between the viscous or waxy epoxypolybutadiene and the curing agent, or to obtain adequate flow into molds or laminates. Reduction in viscosity of the epoxypolymer during formulation and use may of course be achieved by heating, but the accompanying reduction in the pot life of the composition is often disadvantageous. It has been suggested that solvents be used to dilute epoxy polymers, but this technique is of course inapplicable for such end uses as encapsulating or molding. Heretofore, many of the advantages inherent in the use of high molecular weight or high epoxy content polymers have been lost due to difficulties in handling such viscous or solid epoxy polymers, or in finding curing formulations which would lower the viscosity without diminishing the favorable physical properties of the cured product.

It has now been discovered that thermosetting epoxypolybutadiene compositions having a substantially lower viscosity in the uncured state than that of the epoxy polymer itself, yet which preserve and actually enhance the physical properties of the cured polymer, are obtained by formulating and curing epoxypolybutadiene in the presence of the compound limonene dioxide. Limonene dioxide is a monomeric diepoxide of the formula

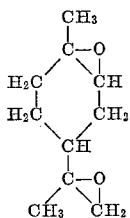

Limonene dioxide is a high boiling liquid, which does not crystallize when cooled to −60° C. but becomes very viscous. Its preparation and properties are described in an article by N. Prileschajew, Berichte 42, 4811 (1909).

Although low molecular weight epoxy monomers or polymers have previously been used to reduce the viscosity of higher polymers, heretofore the presence of such diluents has adversely affected the physical properties of the cured polymer. The use of limonene dioxide has no such adverse effect, but is effectively used to reduce the viscosity of extremely viscous epoxypolybutadienes, of both high molecular weight and high epoxy content, while preserving the excellent physical properties obtained on curing such resins.

Incorporation of limonene dioxide into epoxypolybutadiene compositions substantially extends their utility: for example, in laminates and potting compounds their excellent flow and wetting characteristics at room temperature provide both ease of handling and further stability to premature curing, whereas heretofore it was necessary to heat epoxypolybutadiene compositions to obtain adequate mixing and flow.

As an additional advantage of the composition of this invention, higher molecular weight epoxypolybutadienes may be used as the base resin, due to the lowering of their viscosity to a useful range by the presence of limonene dioxide. There are advantages inherent in the use of higher molecular weight polymers, not only in that the range of polymers which may be used is substantially broadened, but also that higher flexural strengths and better chemical resistance are obtained from higher molecular weight base resins.

Further, curing agents, including solid curing agents, are readily incorporated into these fluid mixtures at low temperatures, thereby prolonging the pot life of the thermosetting compositions. The epoxypolybutadiene/limonene dioxide compositions of this invention are cured by reacting with polyfunctional active hydrogen compounds, such as polyamines, polybasic acids and anhydrides, polyols, polymercaptans, polyphenols and the like.

The base resin for the instant composition is a liquid polymer or copolymer of butadiene which has been epoxidized. The polybutadiene itself may be prepared by any of a number of well known methods, such as emulsion or solution polymerization using a wide variety of catalysts, including free radical, alkali metal, Friedel-Crafts and organo-metallic catalysts. Although heretofore satisfactory products generally required the use of liquid polymers having a molecular weight below about 2500, corresponding to a viscosity below about 50 poises measured at zero shear and 25° C., higher polymers may be used effectively in the instant invention, having molecular weights up to about 10,000 and viscosities of 100 poises and higher. When epoxidized to a low epoxy content, even higher molecular weight polymers are conveniently used, and at epoxy contents of 1-2%, polybutadienes and copolymers having a molecular weight as high as 20,000 may be used. The lower limit of the molecular weight range for these polymers is about 100; that is, mixtures of dimers and trimers could actually be employed, should they be desired to impart particular properties for special applications. In general, a convenient and preferred molecular weight range for the polybutadienes and copolymers is in the range of about 250 to 10,000. Useful techniques for the polymerization and copolymerization of butadiene to form liquid and solid polymers are described in U.S. Patents 2,631,175 and 2,791,618.

For the epoxidation of the polybutadienes and copolymers thereof, standard epoxidation techniques may be used. Aliphatic, aromatic, and inorganic peracids, salts of the peracids, peroxides and hydroperoxides are the most common of the effective epoxidizing agents. For convenience, lower aliphatic peracids, such as performic, peracetic, perpropionic and perbutyric are preferred reagents. With these reagents the epoxidation reaction may be carried out using a preformed peracid, or the peracid may be formed in the reaction medium, generally by adding hydrogen peroxide to an aliphatic acid or anhydride medium. Peracids may be prepared in any known way, such as is described in "Organic Syntheses," Coll. Volume I, Second Edition, John Wiley and Sons (1941), page 431. A number of epoxidation techniques for polybutadiene are illustrated in an article by C. W. Wheelock in Industrial and Engineering Chemistry 50, 299–304 (1958).

The epoxidation may be conducted using stoichiometric amounts of the peracid; that is, one mole of hydrogen peroxide or peracid per double bond in the polymer; or amounts below that theoretically required may be used. There is no significant advantage to using excess oxidant and, although the reactivity and properties of the epoxidized polybutadienes do vary with the degree of epoxidation, it has been found that the use of as little as 5% of the theoretical amount of peracid will produce useful resins. In general, the epoxidized polybutadienes used herein contain at least 1% by weight of epoxy oxygen, and it is preferred for most applications to employ epoxypolybutadienes having about 4% to 10% epoxy oxygen by weight. Epoxypolybutadienes containing more than 10% epoxy oxygen may also be used, since their very high viscosity is reduced to a useful range by the limonene dioxide modifier. A practical epoxidation limit for epoxypolybutadiene is about 15% by weight of epoxy oxygen. Should it be necessary or convenient to add a solvent to facilitate completion of the epoxidation reaction by reducing the viscosity of a particular resin during epoxidation, suitable solvents including such common organics as heptane, benzene and chloroform, the solvent may be removed before or after the addition of the limonene dioxide.

As previously stated, the compositions herein may be cured with any of the curing systems reactive with epoxypolybutadiene. The two epoxy groups of the limonene dioxide undergo the usual reactions of the epoxy group, although they possess different degrees of reactivity. The epoxy group on the cyclohexane ring is somewhat more reactive with acid and anhydride curing agents than is the epoxy group on the side chain; on the other hand, the epoxy group on the side chain shows a somewhat greater reactivity with amines than does the epoxy group on the ring. By appropriate selection of curing agents, compositions having an extremely broad range of useful properties are obtained.

Typical anhydride and acid curing agents for these systems are described in U.S. Patent 2,829,135. Typical amine curing systems are described in U.S. Patent 2,826,556. Typical polyphenols are described in U.S. Patent 2,851,441, and there is substantial literature describing curing of epoxypolybutadienes with these and several other types of curing systems, which may effectively and beneficially be used with the epoxypolybutadiene/limonene dioxide composition of this invention. In general, best results are obtained when the curing agent contains enough reactive groups to react with all of the oxirane oxygen present. And since the limonene dioxide contributes a percent or two of oxirane oxygen to the resin system, it is preferred to employ enough curing agent to react with and to cross-link the limonene dioxide as well as the epoxypolybutadiene.

The amount of limonene dioxide required to reduce the viscosity of the epoxypolybutadiene depends, of course, on the molecular weight and epoxy content of the resin— that is, on its initial viscosity—and on the final viscosity desired for the particular end use. For example, an epoxypolybutadiene having a viscosity of 3000 poises and containing 9% by weight of oxirane oxygen, when combined with 20 parts of limonene dioxide per 100 parts of epoxypolybutadiene, exhibited a viscosity of 150 poises. In general, about 40 parts limonene dioxide, per 100 parts epoxy resin, is the maximum amount of limonene dioxide which should be present before the physical properties of the cured products are substantially adversely affected. Again, at least about 5 parts limonene dioxide should be present before a marked decrease in viscosity is produced. A convenient and preferred amount of limonene dioxide, for substantial viscosity decrease plus retention of physical properties of the cured resins, is in the range of 10 to 20 parts of limonene dioxide per 100 parts epoxypolybutadiene.

The limonene dioxide is readily incorporated with most epoxypolybutadienes merely by stirring at ordinary temperatures. With extremely viscous or solid epoxypolybutadienes, the dilution process may be accelerated by heating the composition. These low viscosity solutions are stable, and the epoxy groups of limonene dioxide react in very much the same way as the epoxy groups of epoxypolybutadiene. No particular modifications in curing agents or techniques are necessary, except for adjustments due to increased oxirane content. With some curing systems, particularly polyamines, longer cure times may be necessary for optimum properties.

The products of this invention are especially useful in such applications as the potting and encapsulating of electronic assemblies, and other casting and laminating applications benefitting from their enhanced flow and wetting properties and decreased viscosity. These products are also useful protective coatings, and find many other applications, based on their superior mechanical and electrical properties and stability characteristics. They may be combined with glass fibers or other reinforcing agents, with plasticizers, fillers, extenders, pigments and dyes, and many other materials, for specific applications.

This invention is illustrated in the following examples, which include specific epoxypolybutadiene compositions modified with limonene dioxide, and illustrate the curing of these compositions with typical cure agents. Physical properties were determined according to "ASTM Standards on Plastics (1958)." Heat distortion temperatures were determined according to ASTM method D648–56, Rockwell hardness according to ASTM method D785–51, flexural properties according to ASTM method D790–58T, tensile properties according to ASTM method D638–58T, and conditioning of specimens according to ASTM method D618–58. All parts are by weight.

EXAMPLE 1

Butadiene was polymerized as follows: About 4.3 parts of sodium as a 46% dispersion in benzene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 399, melt viscosity of 7.0 poises at 25° C. and molecular weight of 850.

This polybutadiene was epoxidized as follows: About 100 parts of liquid polybutadiene, 100 parts of benzene, 21 parts of Dowex resin 50X–12 (a sulfonated styrene-divinylbenzene polymer cross-linked with 12% divinylbenzene) and 16.2 parts of glacial acetic acid were heated with agitation to 60° C. About 70 parts of 50% hydrogen peroxide was then added, over a period of 2 hours. The temperature was maintained at 65° C. for an additional 2 hours, the mixture was cooled to 30° C., mixed with 100 parts of benzene, and filtered. The oily layer was separated by centrifuging, washed with an equal volume of water, made neutral with sodium hydroxide solution, separated, washed again with water, separated, and stripped of benzene at 85° C. and 12 mm. Hg. The epoxypolybutadiene obtained as residue exhibited an iodine number of 186, an epoxy oxygen content of 9.1% and a melt viscosity of 1760 poises at 25° C.

To 100 parts of this epoxypolybutadiene was added 10 parts of limonene dioxide at room temperature. The mixture was blended mechanically, and allowed to stand overnight for escape of bubbles. The viscosity of the blend was 400 poises at 25° C., measured with a Brookfield viscosimeter. To this blend was added 9.5 parts of 2,3-butylene glycol and 30.5 parts of molten maleic anhydride at 60° C. The resulting mixture was cured for 3 hours at 70° C. and 3 hours at 115° C. For comparison, experiments were run replacing the limonene dioxide with other typical reactive diluents, and in the total absence of diluent. Comparative results are shown in Table 1 below:

*Table 1.—Effect of Various Modifiers on Glycol/Anhydride Cured Epoxypolybutadienes*

| Property | Modifier | | | |
|---|---|---|---|---|
| | Limonene Dioxide | Octylene Oxide | Butyl glycidyl ether | None |
| Flexural Str., p.s.i. | 17,210 | 10,590 | 8,810 | 16,000 |
| Flex. Modulus, p.s.i. | 450,000 | 350,000 | 345,000 | 391,000 |
| Tensile Str., p.s.i. | 9,280 | 7,710 | 7,220 | 9,280 |
| Rockwell(M) Hardness [a] | 106 | 92 | 88 | 96 |
| Heat Dist. Temp., °C.[a] | 103 | 76 | 73 | 108 |

[a] Post cured 24 hours at 155° C.

It is seen from the above table that limonene dioxide modified epoxypolybutadiene not only produces cured products having substantially superior physical properties than produced with standard diluents, but these properties are at least as favorable as those obtained when no diluent at all is incorporated into the resin composition. This is a most unusual and useful result, since it is normally found that the use of a diluent also has somewhat of a plasticizing effect on the product, reducing tensile and flexural strengths significantly.

EXAMPLE 2

To 100 parts of the epoxypolybutadiene prepared in Example 1 was added with stirring 10 parts limonene dioxide, 32 parts m-phenylenediamine, and 2 parts phenol, at room temperature. The mixture was cast into bars and between plates following ASTM methods, and cured for 1 hour at 115° C. Comparative experients were run replacing the limonene dioxide with butyl glycidyl ether and with octylene oxide, and in the absence of any diluent. Results for this amine-cured system are shown in Table 2 below:

*Table 2.—Effect of Modifiers on Amine-Cured Epoxypolybutadienes*

| Property | Modifier | | | |
|---|---|---|---|---|
| | Limonene Dioxide | Octylene Oxide | Butyl glycidyl ether | None |
| Flexural Str., p.s.i. | 19,120 | 13,330 | 16,960 | 18,450 |
| Flex. Modulus, p.s.i. | 505,000 | 426,000 | 456,000 | 453,000 |
| Tensile Str., p.s.i. | 11,600 | 9,630 | 10,120 | 9,390 |
| Rockwell(M) Hardness [a] | 112 | 107 | 106 | 107 |
| Heat Dist. Temp., °C.[a] | 93 | 79 | 73 | 91 |

[a] Post cured 24 hours at 150° C.

These comparative results show that, again, the presence of limonene dioxide does not deteriorate and, in fact, enhances the physical properties of amine-cured epoxypolybutadiene.

EXAMPLE 3

The procedure of Example 2 was repeated, employing 20 parts of limonene dioxide with the epoxypolybutadiene. The viscosity of the blend was reduced to 160 poises. Curing with m-phenylenediamine as in Example 2 resulted in the following properties (after one hour at 115° C. and 12 hours at 150° C.):

| | | |
|---|---|---|
| Flexural strength | p.s.i. | 18,400 |
| Flexural modulus | p.s.i. | 542,000 |
| Tensile strength | p.s.i. | 12,100 |
| Rockwell (M) hardness [1] | | 115 |
| Heat distortion temp.[1] | °C. | 92 |

[1] Post cured 24 hours at 150° C.

A control sample cured with m-phenylenediamine, such as that shown in the last column of Table 2, is seen to have similar, somewhat inferior physical properties.

It is apparent that this invention is susceptible to numerous modifications within the scope of the disclosure, and it is intended to include such variations within the scope of the following claims.

I claim:
1. A modified epoxypolybutadiene resin composition comprising epoxypolybutadiene having 1% to 15% by weight of epoxy oxygen and 5 to 40 parts of limonene dioxide per 100 parts epoxypolybutadiene.
2. A modified epoxypolybutadiene resin composition comprising epoxypolybutadiene having 4% to 10% by weight of epoxy oxygen and 10 to 20 parts of limonene dioxide per 100 parts epoxypolybutadiene.
3. A modified thermosetting epoxypolybutadiene resin composition comprising epoxypolybutadiene having 1% to 15% by weight of epoxy oxygen, 5 to 40 parts of limonene dioxide per 100 parts epoxypolybutadiene, and a polyfunctional amine curing agent.
4. The method of reducing the viscosity of epoxypolybutadiene having an epoxy oxygen content of 1% to 15% by weight and derived from polybutadiene having a molecular weight of 100 to 20,000 without adversely affecting the physical properties of the cured resin, which comprises mixing therewith 5 to 40 parts of limonene dioxide per 100 parts epoxypolybutadiene.
5. The method of reducing the viscosity of epoxypolybutadiene having an epoxy oxygen content of 4% to 10% by weight and derived from polybutadiene having a molecular weight of 250 to 10,000 without adversely affecting the physical properties of the cured resin, which comprises mixing therewith 10 to 20 parts of limonene dioxide per 100 parts epoxypolybutadiene.
6. A modified thermoset epoxypolybutadiene resin which comprises the reaction product of epoxypolybutadiene having 1 to 15% by weight of epoxy oxygen, 5 to 40 parts of limonene dioxide per 100 parts epoxypolybutadiene, and a polyfunctional amine curing agent.

References Cited in the file of this patent

UNITED STATES PATENTS

| | | |
|---|---|---|
| 2,360,898 | Sarbach | Oct. 24, 1944 |
| 2,500,016 | Allenby | Mar. 7, 1950 |
| 2,660,563 | Banes et al. | Nov. 24, 1953 |
| 2,842,513 | Fitzgerald et al. | July 8, 1958 |
| 2,949,441 | Newey | Aug. 16, 1960 |
| 2,982,752 | Phillips et al. | May 2, 1961 |

OTHER REFERENCES

N. Prileschajew: Berichte, volume 42, page 4811, 1909.